(12) United States Patent
Moll et al.

(10) Patent No.: US 6,725,912 B1
(45) Date of Patent: Apr. 27, 2004

(54) WIND TUNNEL AND HEAT EXCHANGER THEREFOR

(75) Inventors: Thomas G. Moll, Brooklyn Park, MN (US); Carl E. Jauch, Shoreview, MN (US); C. Lynn Marksberry, Plymouth, MN (US)

(73) Assignee: Aero Systems Engineering, Inc., St. Paul, MN (US)

( * ) Notice: Subject to any disclaimer, the term of this patent is extended or adjusted under 35 U.S.C. 154(b) by 0 days.

(21) Appl. No.: 09/574,088

(22) Filed: May 18, 2000

Related U.S. Application Data

(60) Provisional application No. 60/135,202, filed on May 21, 1999.

(51) Int. Cl.[7] .................................................. F28F 9/26

(52) U.S. Cl. ........................ 165/144; 165/140; 73/147

(58) Field of Search ................................. 165/140, 144, 165/166, 167; 73/147

(56) References Cited

U.S. PATENT DOCUMENTS

| 2,782,009 | A | * | 2/1957 | Rippingille | 165/166 |
| 3,469,623 | A | * | 9/1969 | Rawlings | 165/166 |
| 3,986,549 | A | * | 10/1976 | Huggins et al. | 165/166 |
| 4,099,928 | A | * | 7/1978 | Norback | 165/166 |
| 4,473,111 | A | * | 9/1984 | Steeb | 165/166 |
| 4,681,155 | A | * | 7/1987 | Kredo | 165/166 |
| 4,804,041 | A | * | 2/1989 | Hasegawa et al. | 165/166 |
| 4,841,538 | A | | 6/1989 | Yanabu et al. | 372/58 |
| 4,883,117 | A | * | 11/1989 | Dobbs et al. | 165/166 |
| 5,400,854 | A | * | 3/1995 | Iio et al. | 165/166 |
| 5,417,280 | A | | 5/1995 | Hayashi et al. | 165/153 |
| 5,495,754 | A | * | 3/1996 | Starr, Jr. et al. | 73/147 |

* cited by examiner

Primary Examiner—Christopher Atkinson
(74) Attorney, Agent, or Firm—Dorsey & Whitney LLP

(57) ABSTRACT

A wind tunnel and a heat exchanger for use in the wind tunnel. The heat exchanger is a plate-fin type heat exchanger having at least one heat exchanger unit with an inflow end and an outflow end, and air flow section and a coolant flow section. The air flow section includes fins generally aligned with the air flow through the exchanger and the coolant flow section includes fins defining a coolant passageway.

16 Claims, 10 Drawing Sheets

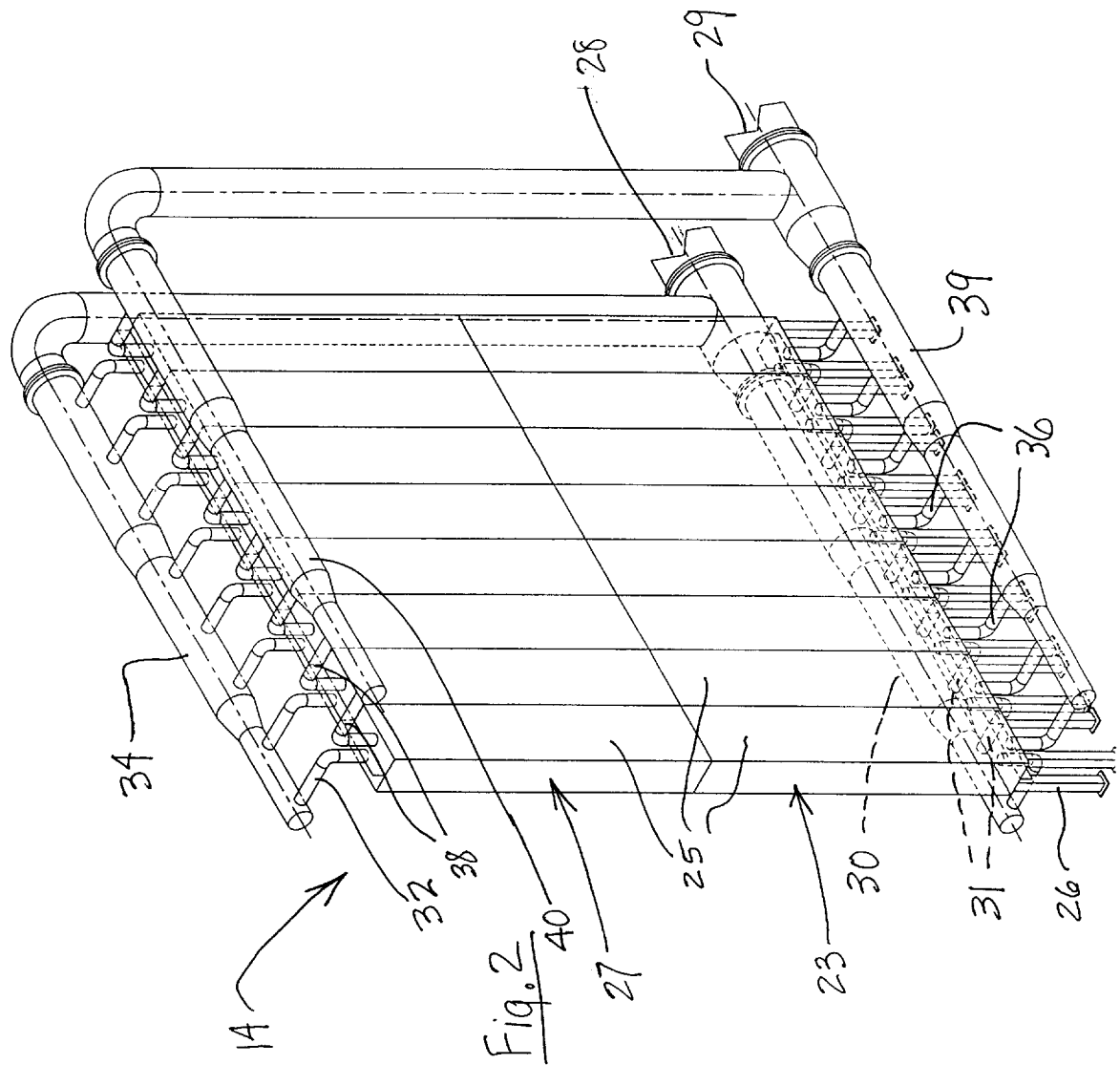

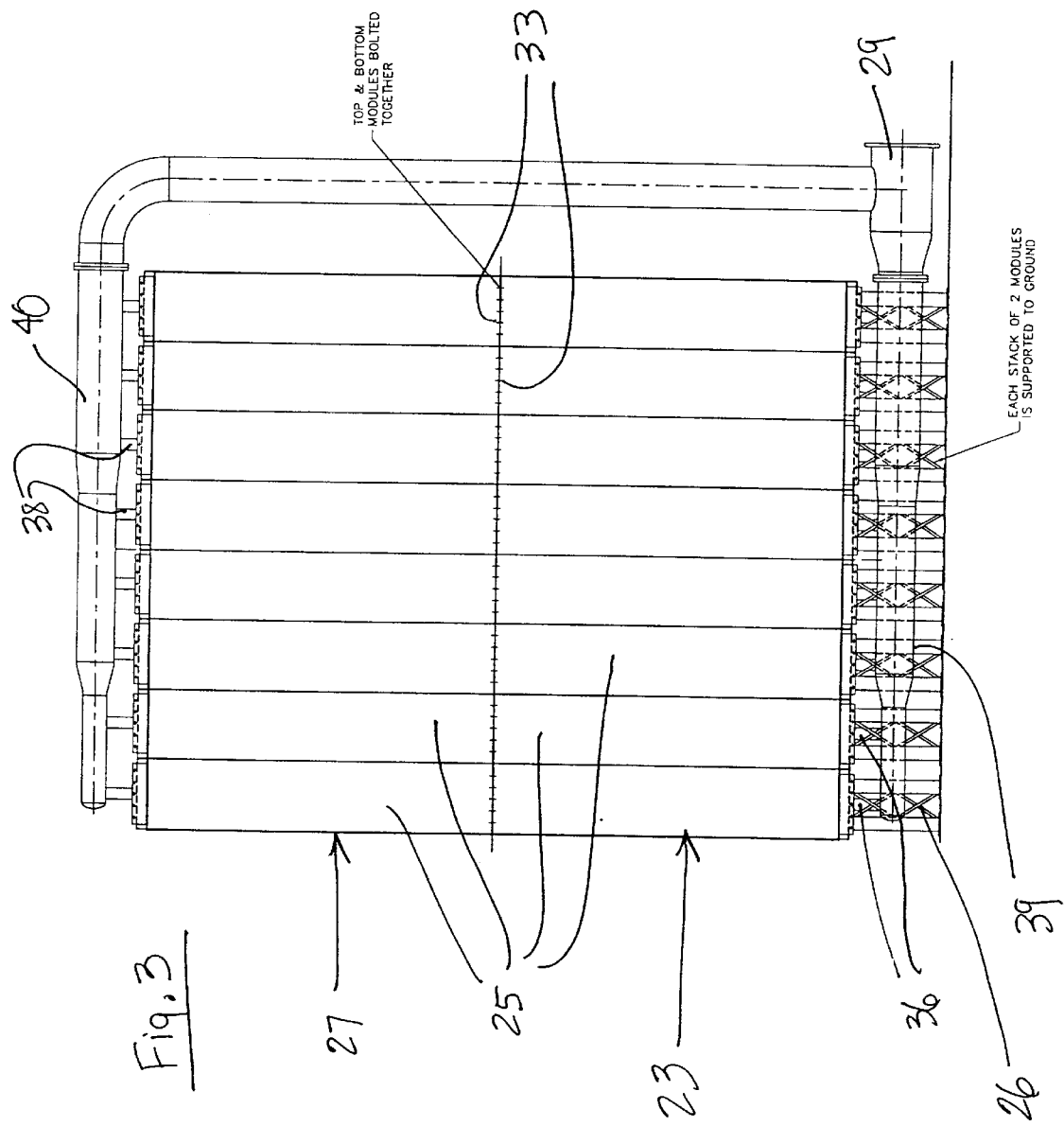

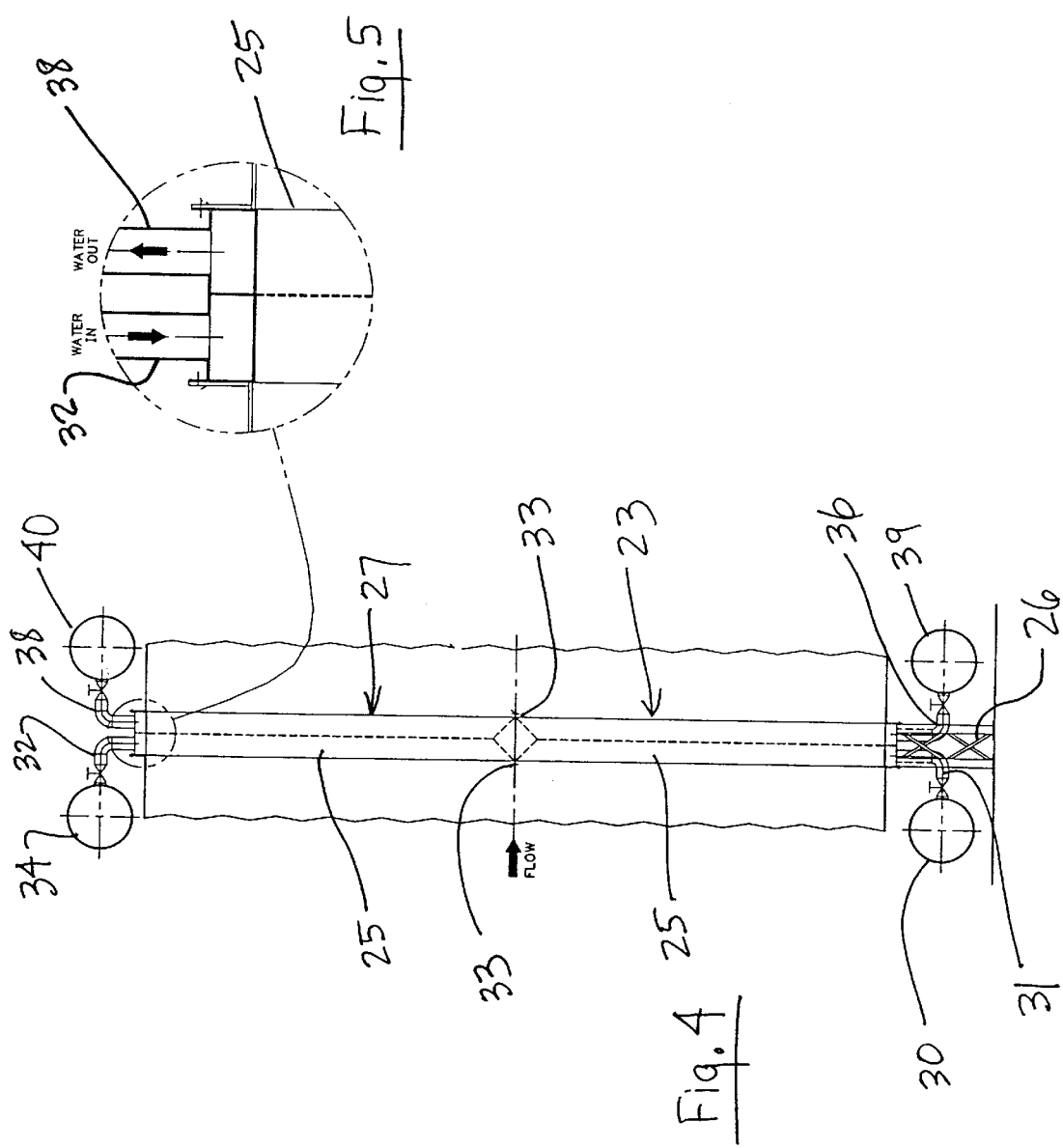

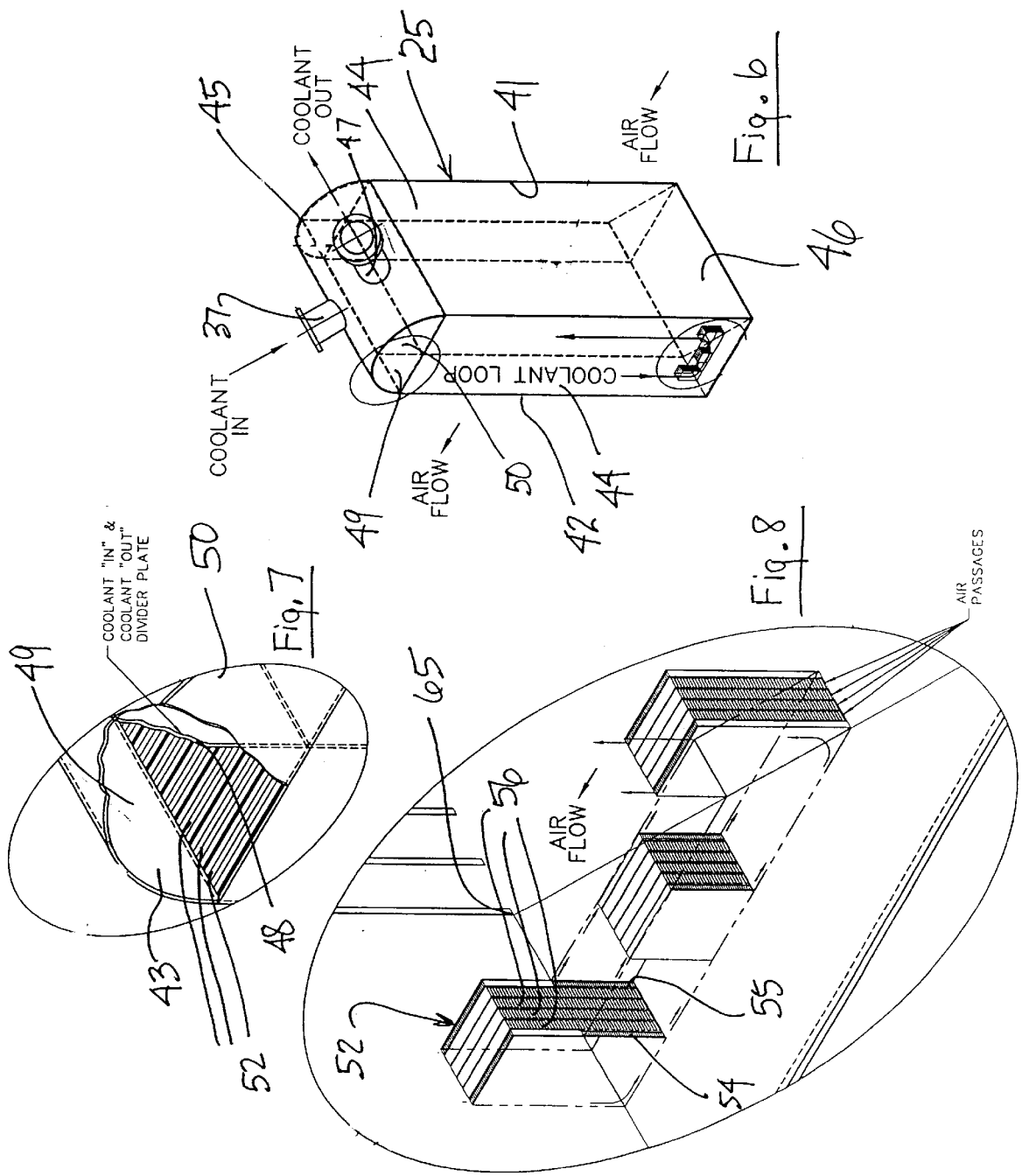

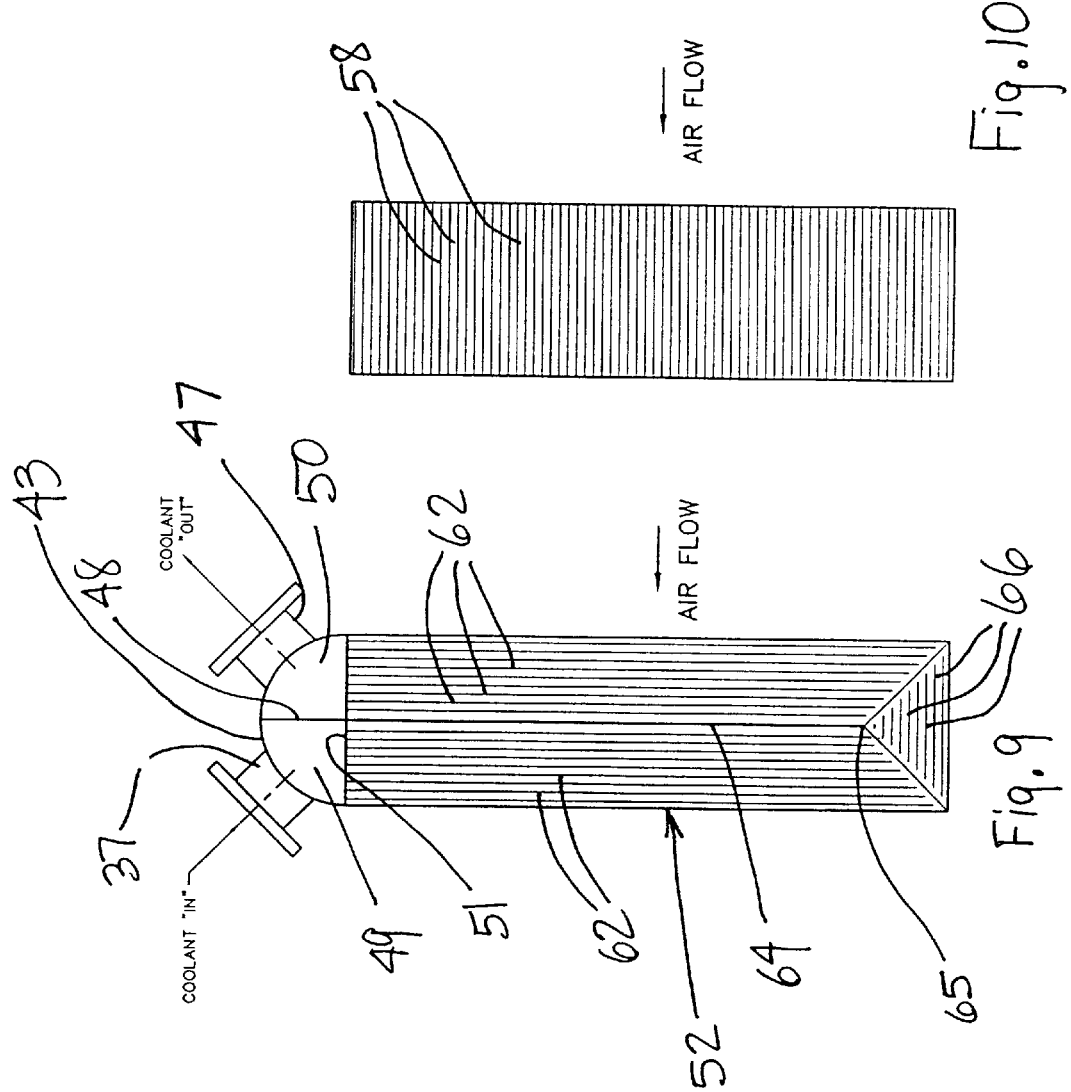

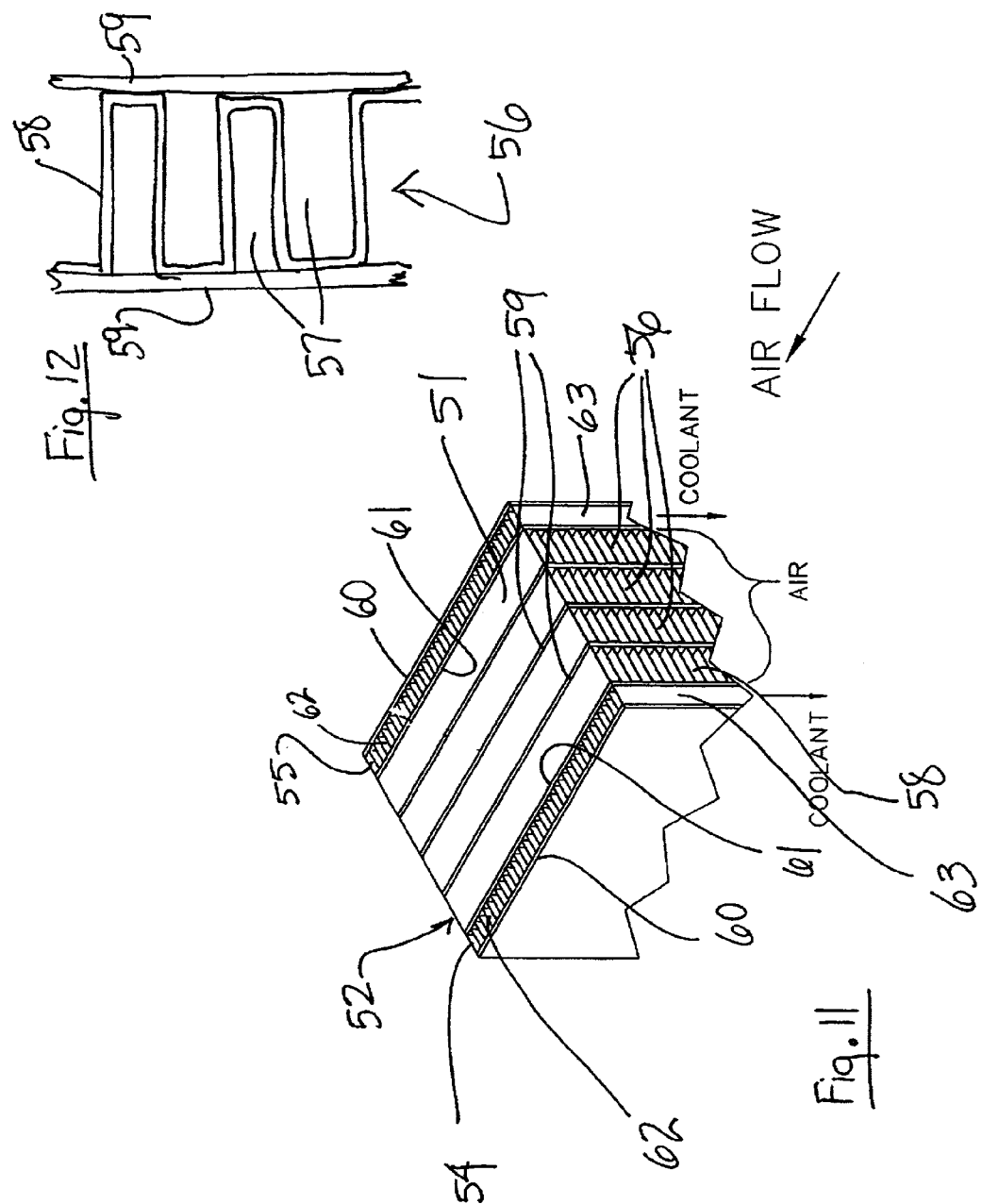

WIND TUNNEL AND HEAT EXCHANGER THEREFOR

This application claims the benefit of Provisional Application Ser. No. 60/135,202 filed May 21, 1999.

BACKGROUND OF THE INVENTION

1. Field of the Invention

The present invention relates generally to wind tunnels. More particularly, the present invention relates to closed circuit wind tunnels and the use of a plate-fin heat exchanger in such wind tunnels.

2. Description of the Prior Art

Wind tunnels help researchers simulate the forces acting on an object moving through air. To obtain useful results, the conditions in the wind tunnel should closely match the conditions the object will encounter in actual service.

Flow generation means in the form of a fan generally drives the air flow in a wind tunnel to create the tunnel flowstream. Unfortunately, much of the energy supplied by the fan is eventually converted into heat in the tunnel flowstream. This means that air flow in a high-powered wind tunnel must be cooled to order to maintain functional testing conditions.

Since the inception of heat exchangers in wind tunnels (circa 1940), wind tunnels have used a "fin-tube" style, water-cooled radiator type of heat exchanger. Such heat exchanger transfers the heat energy from the flowstream to a coolant. The heated coolant is then pumped out of the heat exchanger, cooled by external means such as a cooling tower, and then recirculated to the heat exchanger. This "fin-tube" type of heat exchanger consists of coolant-carrying tubes that cross back and forth across the air flow passage. These tubes include attached fins that help collect the flowstream heat and transfer it to the coolant. Several problems exist with this type of heat exchanger for wind tunnel applications. For example a "fin-tube" type of heat exchanger presents a very large resistance to the flowstream. The resistance increases the power needed to drive the wind tunnel, which in turn increases the temperature of the flow even more. To reduce this resistance, many wind tunnels increase the size of the heat exchanger in the cross-flowstream direction. This in turn requires the expansion of the wind tunnel duct cross-section to house the larger heat exchanger. The transition from a smaller duct upstream of the heat exchanger to the larger duct required to house the heat exchanger often requires the use of a wide angle diffuser which significantly increases the risk of flow separation, turbulence, and angularity problems.

Further, for large wind tunnel applications, multiple modules or cores of "fin-tube" type heat exchangers are commonly supported as an array in an "egg crate" type structure. Thus, large coolant feed and return pipes must be routed within this "egg crate" to each of the heat exchanger modules. These support structures and piping take up considerable space, thereby resulting in a significant increase in flowstream resistance and misdirection of the air flow.

Still further, the flow around the cross-stream tubes in a "fin-tube" heat exchanger produces unsteady turbulent flow characteristics which in turn causes dynamic forces on the tube. These forces may induce tube vibration due to the low natural frequency of the slender, long span coolant tube which in turn may lead to undesirable noise and high stress or fatigue which often results in tube failure or leaks. The cross-stream tubes also cause unsteadiness and separation in the flowsteam. These effects degrade the quality of any experimental results. Still further, because the fins in the heat exchanger are press fit onto the tubes, the unsteady flow and resulting vibrations over time can cause the fins to separate or lose their grip on the tube. This results in a degradation of the heat transfer effectiveness of the heat exchanger.

Accordingly, there is a need in the art for a wind tunnel with an improved heat exchanger structure which solves the problems and overcomes the limitations of the prior art.

SUMMARY OF THE INVENTION

In contrast to the prior art, the present invention relates to a wind tunnel with an improved heat exchanger structure that overcomes the problems and limitations of the prior art. Specifically, the wind tunnel and heat exchanger combination of the present invention provides for a more compact and efficient heat exchanger capability, reduces turbulence in the flowstream and minimizes the flowstream blockage or resistance resulting from the heat exchanger.

More specifically, the present invention includes a wind tunnel with a "plate-fin" heat exchanger comprised of a plurality of heat transfer fins separated by a plurality of parting sheets. The heat exchanger fins and parting sheets create a plurality of passageways or channels for passage of the air flowstream and the cooling fluid.

"Plate-fin" heat exchangers have particular application to wind tunnels and offer significant advantages in flow quality over wind tunnel designs of the prior art. First, plate-fin heat exchangers eliminate the turbulence generated by flow unsteadiness and separation around the tubes. This improves the flowstream through the test section and allows for better and more accurate measurements. Lower turbulence levels also enhance the acoustic characteristics of the tunnel, which can be very critical for certain types of testing. A second advantage of the plate-fin heat exchanger over the prior art is its flow straightening effect. The plate-fin modules are made of many small cell, long length flow passages. These passages are similar to the honeycomb flow straighteners typically installed in wind tunnels. A third advantage in flow quality of plate-fin heat exchangers is that their high efficiency allows designers to reduce the size of, or even eliminate the need for, a wide angle diffuser which is often required when using "fin-tube" heat exchangers.

Besides the advantages in flow quality, plate-fin heat exchangers also offer significant economic advantages. These advantages include: i) reduced capital costs because the tunnel shell can be shorter and the cross sectional size of the tunnel can be smaller; ii) reduced operational costs due to higher thermal and aerodynamic efficiencies; iii) lower piping and support structure costs because the design requires fewer pipes inside the wind tunnel; iv) simpler maintenance and removal because the coolant piping is accessible from outside the tunnel; v) lower cost of other flow conditioning equipment because the plate-fin heat exchanger improves, rather than degrades, flow quality; vi) fewer leaks and ruptures in the coolant tubing because the plate-fin modules vibrate less and are structurally more robust; and vii) improved maintenance in thermal efficiency over time resulting from a reduction of vibration induced fin degradation.

Accordingly, it is an object of the present invention to provide a closed circuit wind tunnel with an improved heat exchanger.

Another object of the present invention is to provide a wind tunnel with a heat exchanger which minimizes turbulence in the flowstream.

A further object of the present invention is to provide a wind tunnel with a heat exchanger which is highly efficient and economical.

A still further object of the present invention is to provide a closed circuit wind tunnel with a plate-fin type heat exchanger.

These and other objects of the present invention will become apparent with reference to the drawings, the description of the preferred embodiment and the appended claims.

DESCRIPTION OF THE DRAWINGS

FIG. 2 is an isometric view of the heat exchanger assembly for use in the wind tunnel of the present invention.

FIG. 3 is an elevational view of the air inlet side of the heat exchanger assembly of FIG. 2.

FIG. 4 is an elevational end view of the heat exchanger assembly of FIG. 2, with portions shown in broken lines.

FIG. 5 is an enlarged fragmentary view showing the water box detail for one of the heat exchanger modules of the heat exchanger assembly of FIG. 4.

FIG. 6 is an isometric view, with portions shown in broken lines, of a heat exchanger module for use in the wind tunnel of the present invention.

FIG. 7 is an enlarged fragmentary view, with portions broken away, showing the cooling fluid manifold at the manifold end of the module.

FIG. 8 is an enlarged fragmentary view showing a portion of a heat exchanger unit at the end of the module opposite the manifold end.

FIG. 9 is a sectional view as viewed through one of the cooling fluid passages and showing the flow paths of coolant through the module.

FIG. 10 is a sectional view as viewed through one of the air flow passages and showing the flow path of air through the module.

FIG. 11 is an isometric, fragmentary view of the coolant manifold end of a heat exchanger unit in accordance with the present invention.

FIG. 12 is an enlarged, fragmentary elevational view showing the corrugated fin construction for an air flow element in the heat exchanger unit.

DESCRIPTION OF THE PREFERRED EMBODIMENT

Figure 1:
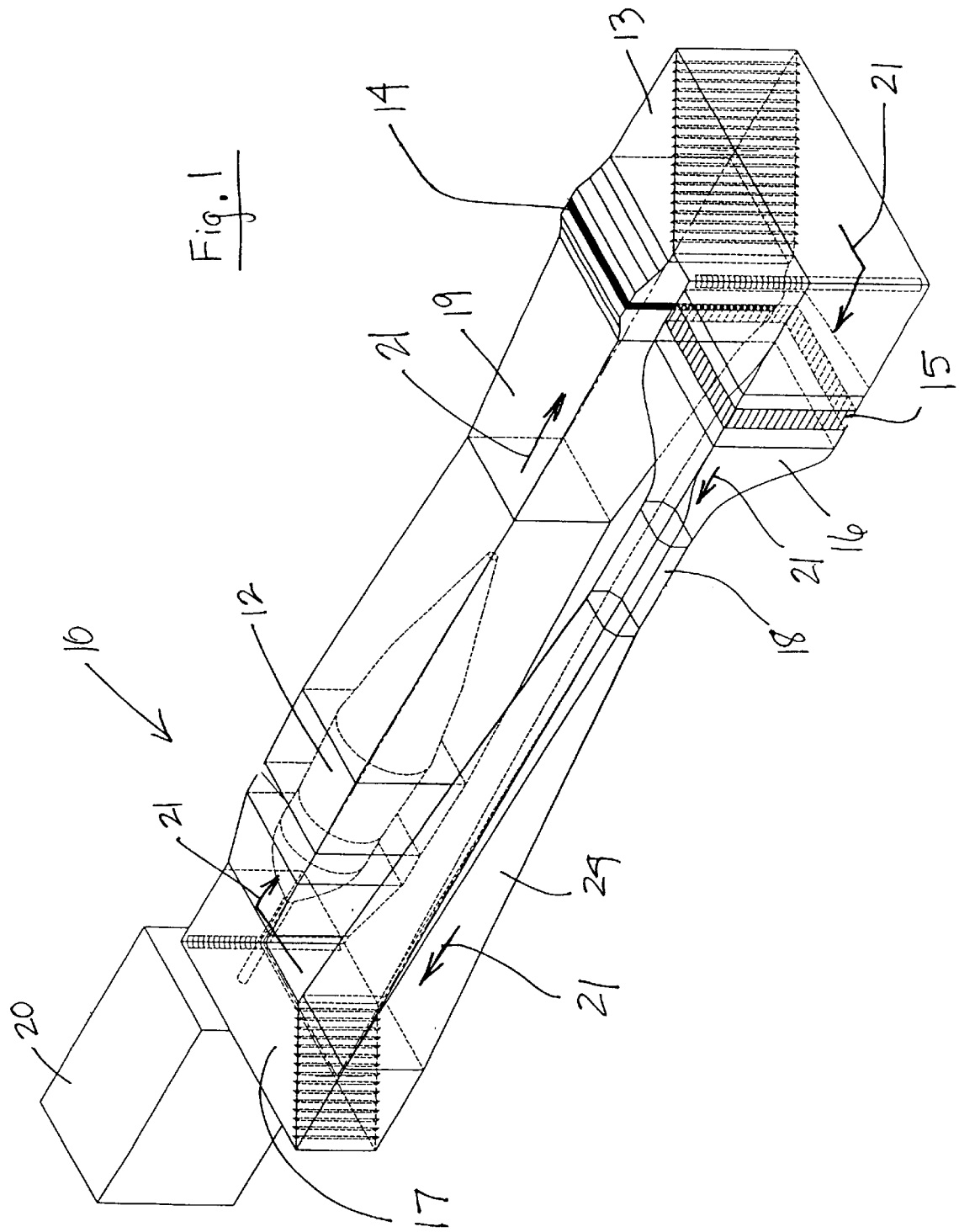
FIG. 1 is an isometric view of the wind tunnel in accordance with the present invention.

Reference is first made to FIG. 1 showing an isometric view of the wind tunnel in accordance with the present invention in combination with the improved heat exchanger. The wind tunnel 10 includes a flow generator means which is commonly in the form of a fan 12, a heat exchanger or heat exchanger assembly 14, a plurality of turning vanes 13 and 17, one or more flow conditioning elements 15, a nozzle 16 and a test section 18. During operation, the fan 12 is driven by a motor drive 20 to create a high velocity air flowstream 21 in the flow duct 19. The actual air velocity which is generated varies greatly depending on the intended use for the wind tunnel; however, typical values range from as low as 100 mph or lower to several times the speed of sound. The preferred embodiment uses a fan to accelerate the air because of its ability to move large volumes of air. However, those skilled in the art will realize that various alternate flow generating means can be used as well such as blowers, compressors, diffusers, nozzles, vacuum tanks, high pressure storage chambers and various combinations thereof.

The motor drive 20 powers the flow generator 12. Unfortunately, much of the energy supplied by the motor drive 20 and the fan 12 is converted into heat. This can cause the temperature of the air flowstream 21 leaving the flow generator 12 to exceed functional limits, making it difficult for operators to obtain useful results. The preferred embodiment solves this problem by directing the air flowstream 21 through the flow duct 19 and into the heat exchanger 14. The temperature of the air leaving the heat exchanger 14 will vary depending upon the intended application of the wind tunnel and the velocity airflow involved; however, a typical temperature for air exiting the heat exchanger 14 is in the range of 80–160° F. and most preferably less than 120° F. After leaving the heat exchanger 14, the air flowstream 21 travels through the turning vane 13, which changes the flow direction of the flowstream 180°, and to the flow conditioning elements 15. The flow conditioning elements straighten the flowstream 21 to further reduce any turbulence. The preferred embodiment contemplates use of a honeycomb-style flow straightener. However, depending on the wind tunnel application, the flow conditioning elements could be eliminated or replaced by other devices that straighten fluid flow, reduce turbulence or otherwise condition the flowstream as desired.

Upon leaving the flow conditioning elements 15, the flowstream 21 is further accelerated by the nozzle 16 before entering the test section 18. During use, the flowstream 21 passes over a test object (not shown) in the test section 18 before being returned by the flow duct 24 and through the turning vane 17 to the flow generator 12. Although the preferred embodiment shows the heat exchanger 14 upstream of and in combination with the flow conditioning elements 15, the heat exchanger 14 of the present invention can be placed anywhere in the wind tunnel flow stream between the fan 12 and the test section 18. Further, because of the flow conditioning properties of the exchanger 14 of the present invention, it can be used, in certain circumstances, to replace the flow straightener element 15.

In the preferred embodiment, the wind tunnel is a closed circuit wind tunnel in which the air is continuously circulated through the system along the air flowstream 21. It is understood, however, that many of the concepts and features of the present invention are equally applicable to wind tunnels which are not of the closed circuit type.

Reference is next made to FIGS. 2, 3 and 4 illustrating an isometric and front and side elevational views of the heat exchanger assembly 14 of the present invention. As shown, the heat exchanger assembly 14 is mounted on supports 26 and includes a lower heat exchanger section 23 comprised of a plurality of heat exchanger modules 25 positioned in side-by-side relationship and an upper heat exchanger section 27 also comprised of a plurality of heat exchanger modules 25 positioned in side-by-side relationship. In the preferred embodiment, the lower heat exchanger section 23 is supported on the frame 26 and the upper heat exchanger section 27 is supported on top of the lower heat exchanger section 23.

The lower and upper heat exchanger sections 23 and 27 can be connected with each other by any desired means. For example, the mating ends of the modules 25 in the lower and upper sections 23 and 27 may be provided with flanges and bolted together with bolts 33 as shown in FIGS. 3 and 4. This design allows operators to easily remove any individual module for maintenance or replacement. It also provides flexibility in heat exchanger design.

With continuing reference to FIGS. 2, 3 and 4, the heat exchanger assembly 14 is provided with lower and upper coolant supply conduits 30 and 34, respectively. These supply conduits 30 and 34 are connected with the main cooling fluid supply pipe 28. A coolant inlet conduit 31 extends from the supply conduit 30 to each of the modules 25 in the lower heat exchanger section 23 to provide coolant to such modules. Similarly, a coolant inlet conduit 32 extends from the supply conduit 34 into the modules 25 in the upper heat exchanger section 27 to provide coolant to such modules.

The first heat exchanger assembly 14 is also provided with lower and upper coolant return conduits 39 and 40 and associated conduits 36 and 38 to facilitate flow of coolant from the modules in the lower and upper sections 23 and 27 to the main coolant return pipe 29. Specifically, the conduits 36 extends between the modules in the lower section 23 and the conduit 39, while the conduits 38 extend between the modules in the upper section 27 and the conduit 40.

With the above structure, the modules 25 can be stacked as shown, with the modules in the lower and upper sections 23 and 27 being inverted relative to one another and the supply conduits being located entirely on the exterior of assembly 14. In the preferred embodiment, the cooling fluid is water, which is typically provided with corrosion inhibitors, biocide and/or antifreeze chemicals. However, it is contemplated that other cooling fluids could be utilized as well including liquids other than water or gases such as air.

Reference is next made to FIG. 6 showing an isometric view of a single heat exchanger module 25. As shown, each heat exchanger module 25 includes a front or air flow inlet side 41, a back or air exit side 42 and a pair of sides 44,44 separating the front and back sides 41 and 42. Each module 25 also includes a coolant manifold end 45 and an end 46 opposite the manifold end. As best shown in FIGS. 6, 7 and 9, the manifold end 45 of each module 25 is provided with a coolant inlet manifold chamber 49 and a coolant outlet manifold chamber 50 for facilitating the flow of coolant fluid to and from the heat exchanger units as described in greater detail below.

With specific reference to FIG. 9, the manifold end 45 of each module includes an outer wall 43, a separation wall 51 and a generally vertical partition wall 48. In the embodiment shown, the inlet manifold chamber 49 is defined by a portion of the walls 43 and 51 and one side of the partition wall 48. The outlet or return manifold chamber 50 is defined by the other portions of the walls 43 and 51 and the other side of the partition wall 48. Connected with the chambers 49 and 50 are inlet and outlet connection members 37 and 47, respectively, for connecting each module 25 to its respective conduit 31, 32 or 36,38 (FIG. 2).

Each of the heat exchanger modules 25 is comprised of a plurality of heat exchanger units 52 which are positioned in side-by-side relationship to one another in a direction perpendicular to the direction of air flow and which are shown best in FIGS. 7, 8 and 11. In the preferred embodiment, each of the heat exchanger units 52 includes a pair of coolant flow members or sections 54 and 55 on its sides and one or more air flow members or sections 56 sandwiched between the coolant flow members 54 and 55. As shown best in FIGS. 11 and 12, each of the air flow members 56 includes a plurality of fins 58 aligned with the direction of air flow and defining flow passages 57 to direct the flow of air through the passages 57 from the inlet side of the member 56 to its outlet side. These fins 58 may be conventional corrugated heat exchanger fins such as that best shown in FIG. 12. As shown, the fins 58 extend back and forth between a pair of parting sheets 59 and are commonly secured to the parting sheets 59 by brazing or the like. Accordingly, the parting sheets 59 define and separate each air flow member 56. In the preferred embodiment, four air flow members 56 are shown as being sandwiched between each pair of coolant flow members 54 and 55; however, any number of air flow members can be utilized depending upon the particular use for the wind tunnel. In some applications only one or two air flow members 56 are sandwiched between the coolant flow members.

The manifold end of each of the heat exchanger units 52 includes a wall 51 defining a portion of the manifold chambers 49 and 50 and positioned between the chambers 49 and 50 (FIG. 7) and the air flow members 56. In actuality, the wall 51 is formed by the top fin 58 extending between the parting sheets 59. Thus, as illustrated best in FIG. 11, the separation wall 51 extends only over the air flow members 56 to prevent coolant fluid in the manifold chambers 49 and 50 from entering the air flow members 56.

Each of the coolant flow members 54 and 55 is defined by a pair of parting sheets 60 and 61 (FIG. 11) and includes a plurality of generally vertically extending fins 62 extending from the manifold end of each heat exchanger unit 52 toward the end opposite the manifold end. These vertically extending fins 62 define a plurality of coolant fluid inlet and return passages as illustrated best in FIG. 9. Each of the coolant fluid members 54 and 55 also includes a central wall or fin 64 extending from the partition wall 48 to the fluid passage transition point 65 to define and separate the coolant inlet and return passages from one another.

Figure 11A:
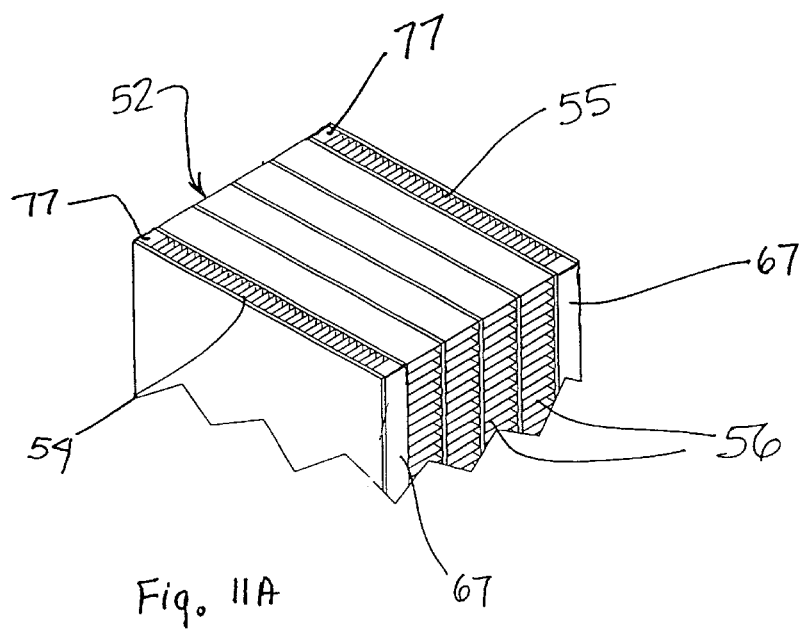
FIG. 11A is a further isometric fragmentary view of a heat exchanger unit.

The end of the coolant flow members 54 and 55 opposite the manifold end includes a plurality of generally horizontal fins or fin sections 66. These horizontal fins 66 are connected with the generally vertical fins 62 on each side of the divider fin 64 to define coolant flow passages from the chamber 49 to the chamber 50. Specifically, flow of cooling fluid passes from the chamber 49 through the flow passages defined by the fins 62 on the left-hand side of the divider fin 64 as shown in FIG. 9, horizontally between the fins 66 and then upwardly between the fins 62 on the right-hand side of the divider fin 64 shown in FIG. 9 to the outlet chamber 50. In the preferred embodiment, the fins 62 and 66 in the cooling members 54 and 55 define a coolant passageway and are of a corrugated structure similar to the fins 58 described above and shown in FIG. 12. Similar to the end fin 58 in the air flow member defining the separation wall 51, the end fins 62 and 66 in the coolant flow members 54 and 55 define the outer end edges 63 and the end edge 67 (FIG. 14) opposite the manifold end. As shown in FIG. 11A, the coolant flow sections 54 and 55 are preferably provided with lead edge headers 67 and trailing edge headers 77, respectively. Also, each of the coolant sections 54 and 55 show a generally countercurrent flow of fluid relative to the air flow, however, this good could be altered, if desired.

Each module 25 can be comprised of any number of heat exchanger units 52 desired. Further, the entire collection of heat exchanger units 52 in each module 25, including the parting sheets 59, 60 and 61, the fins 58, 62 and 66 and the elements of each heat exchanger unit 52 are brazed into a monolithic unit. This provides the plate-fin heat exchanger of the present invention capable of resisting extremely high tunnel flows and coolant pressures. Under operating conditions, the parting sheets 59, 60 and 61 function as primary heat transfer surfaces and also function to prevent the mixing of the air flow with the coolant fluid. The heat transfer fins 58, 62 and 66 function to maintain the structural rigidity of each heat exchanger unit and also serve as secondary heat transfer surfaces.

The heat transfer and flow defining fins 58, 62 and 66 in the preferred embodiment are made from aluminum because of its high heat transfer properties, good brazing characteristics and relatively low cost. Those skilled in the art, however, will understand that a wide variety of materials such as stainless steel, copper, nickel, carbon steel, alloy steel or titanium can be substituted.

Figure 13:
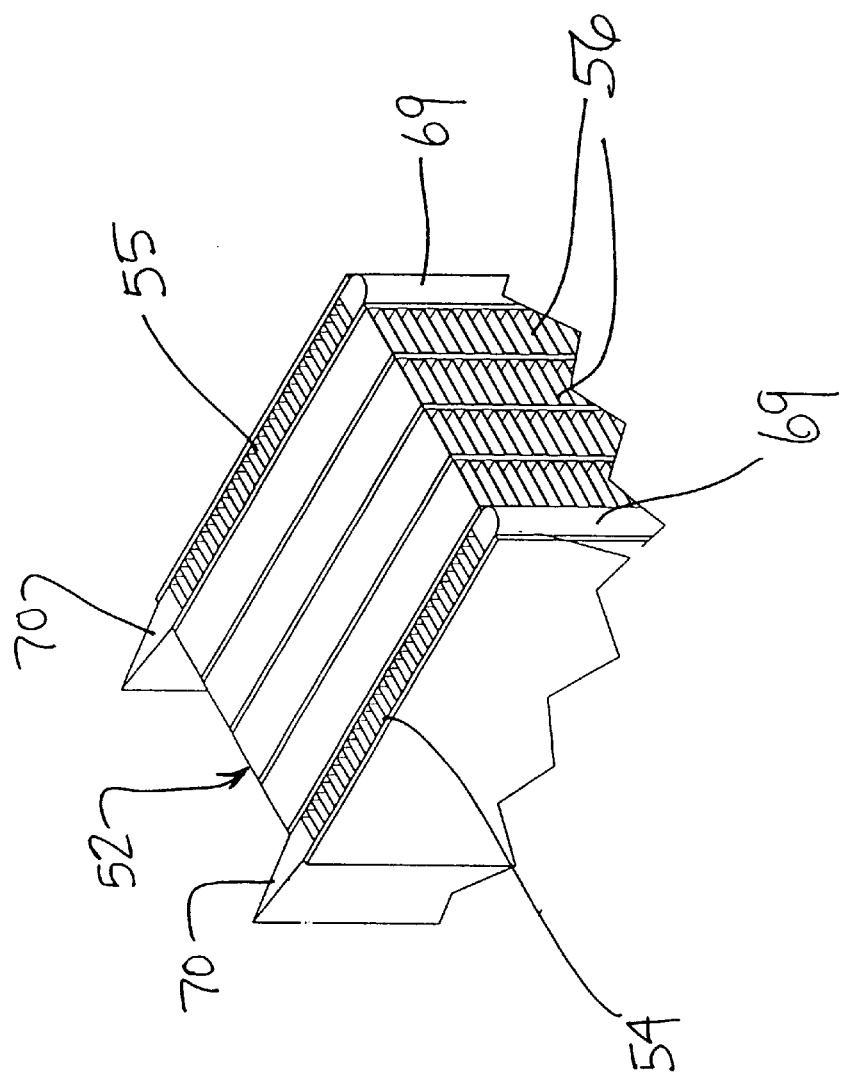
FIG. 13 is an isometric view of the manifold end of an alternate embodiment of a heat exchanger unit in accordance with the present invention.

FIG. 13 discloses an alternate embodiment illustrating a modified heat exchanger unit 52 designed to reduce tunnel flow resistance. In this embodiment, the coolant flow members 54 and 55 of each heat exchanger unit 52 are provided with leading edge headers 69 with a rounded profile and a trailing edge header 70 with a tapered profile. The rounded profile header 69 at the leading edge which faces the air flow reduces drag and turbulence in the air flow. Similarly, the tapered edge header 70 at the trailing edge of the unit 52 reduces drag and turbulence caused by eddies on the downstream side of the unit 52.

Figure 14:
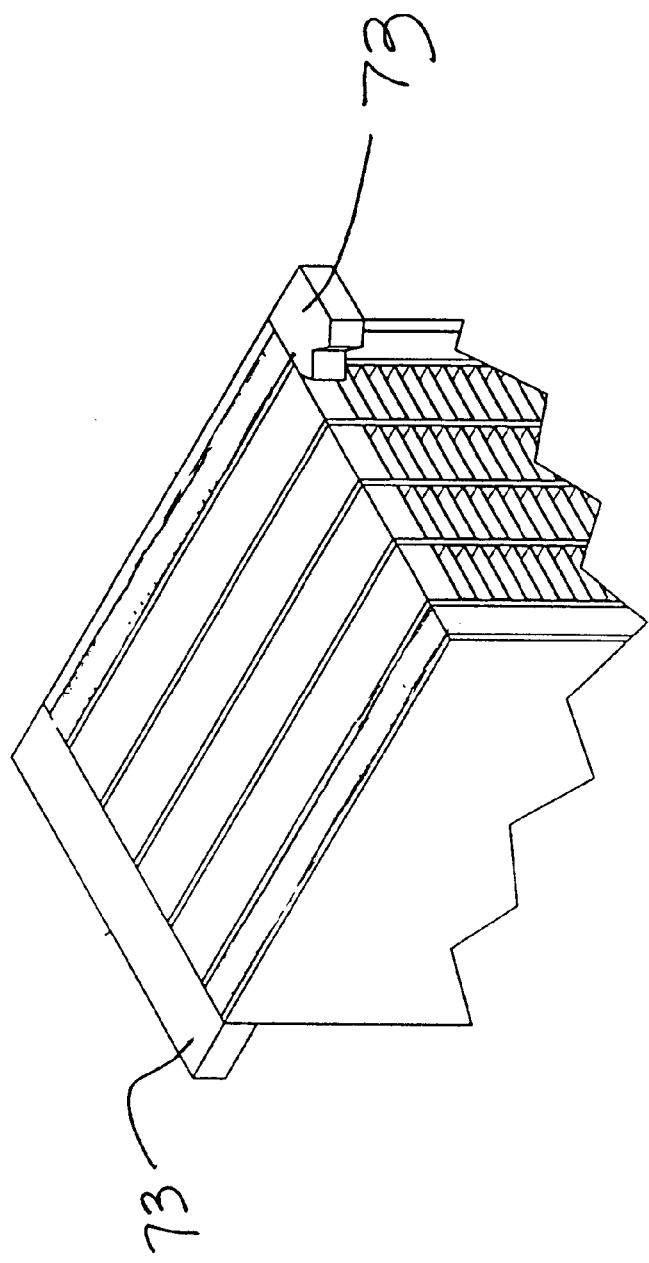
FIG. 14 is an isometric view of the end of a heat exchanger unit opposite the coolant manifold end.

FIG. 14 shows the end of the heat exchanger unit 52 opposite the manifold end. As shown, both the air flow and coolant flow passages are closed at that end. Flanges 73 are also provided for connecting stacked modules 25 together.

Figure 15:
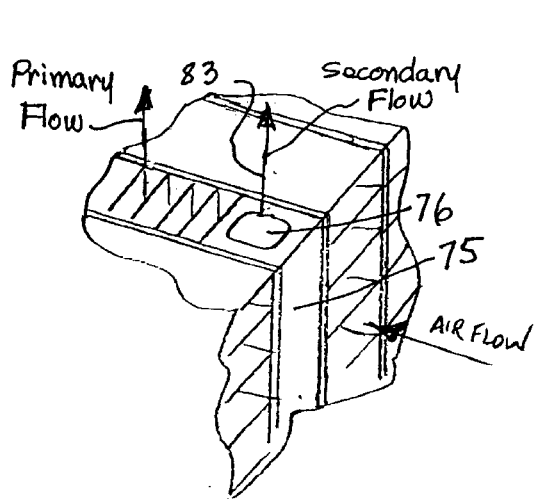
FIG. 15 is a fragmentary isometric view of an alternate heat exchanger unit.
Figure 16:
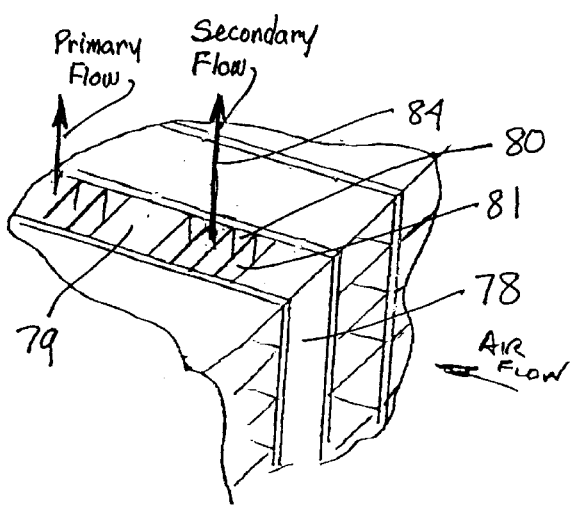
FIG. 16 is a fragmentary isometric view of a still further alternate heat exchanger unit.

FIGS. 15 and 16 show alternate embodiments of the heat exchanger unit, and in particular, embodiments which are useful for climatic wind tunnels. In some climatic wind tunnels, fine droplets of super-cooled water (liquid phase water below 32° F.) may be entrained within the air stream and can tend to accumulate as ice within and/or on surfaces of the heat exchanger. To prevent or minimize ice build up on the coolant portions of the heat exchanger unit, means may be provided such as those shown in FIGS. 15 and 16 for providing warmer coolant which is effective to prevent any such ice build up.

Specifically, in the embodiments of both FIGS. 15 and 16, a secondary liquid flow passage is formed in the coolant portion of the heat exchanger unit. Flow of liquid through this secondary flow passage can be independently controlled and can be at a temperature different than that of the primary flow passages for the purpose of controlling the transfer of heat or coolant to the leading edge header of the coolant section.

Specifically, with reference to FIGS. 15 and 16, the header 75 at the leading edge of the coolant flow section is provided with an interior flow passage 76 through which a secondary coolant 83 can flow. In a climatic wind tunnel application in which the air flow includes entrained, super-cooled water, this secondary coolant 83 can be provided at an elevated temperature to prevent the water droplets from freezing on the leading edge of the header 75.

In FIG. 16, a pair of headers 78 and 79 are provided, with a secondary flow passage between such headers. This secondary flow passage includes a plurality of adjacent flow channels 80 separated by a plurality of flow guides or partitions 81. Again, for a climatic wind tunnel application in which the air flow includes entrained, super-cooled water, a secondary coolant 84 which is provided at a temperature greater than that of the primary coolant can be directed through the secondary coolant passage to prevent ice from forming on the lead edge of the header 78. In accordance with these embodiments, secondary flow channels would also need to be provided in the trailing headers to provide flow to the lead edge headers.

Having described the structure of the wind tunnel of the present invention in detail, the operation of the wind tunnel, and more specifically the heat exchanger, can be understood best as follows. During operation, air in the flow stream flows through the heat exchanger in the direction illustrated best in FIGS. 6,8, 9, 10 and 11. Specifically, air flows through the passages formed by the parting plates 59 and the cooling fins 58 as shown best in FIGS. 10 and 11. At the same time, coolant fluid passes from the main supply 28. (FIG. 2) through the conduits 30,34 and 31,32 to the manifold chambers 49. As shown best in FIG. 7, the coolant fluid then passes from the manifold chamber 49 through the coolant passages defined by the fins 62 to the left of the divider fin 64, across the end of the heat exchanger unit 52 through the passages defined by the fins 66 and back through the flow passages between the fins 62 to the right of the divider fin 64 to the manifold chamber 50. The coolant fluid is then returned through the conduits 36, 38, 39 and 40 to the main coolant fluid return 29. From here, the heated coolant is cooled by external means such as a cooling tower and recirculated back through the heat exchanger inlet conduit 28.

Although the description of the preferred embodiment has been quite specific, it is contemplated that various modifications could be made without deviating from the spirit of the present invention. Accordingly, it is intended that the scope of the present invention be dictated by the appended claims rather than by the description of the preferred embodiment.

What is claimed is:

1. A wind tunnel comprising:
    a flow generating member;
    a test section;
    a flow path from said flow generating member to said test section; and
    at least one plate-fin heat exchanger unit positioned in said flow path and having;
        an air inflow end,
        an air outflow end,
        a peripheral edge,
        a plurality of air flow sections each having a plurality of first heat transfer fins generally aligned in said first direction and each defining a plurality of air flow passageways generally parallel to said first direction wherein air enters said inflow end, flows through said air passageways in a first direction and exits from said outflow end, and
        first and second coolant flow sections positioned adjacent to and on opposite sides of said plurality of air flow sections, each of said first and second coolant flow sections including a first section having a plurality of fins defining a plurality of first coolant passageways for directing coolant through said first coolant passageways in a first coolant passageway direction perpendicular to said first direction, a second section having a plurality of fins defining a plurality of second coolant passageways for directing coolant through said second coolant passageways in a second coolant passageway direction parallel to said first direction and perpendicular to said first coolant passageway direction and a third section having a plurality of fins defining a plurality of third coolant passageways for directing coolant through said third coolant passageways in a third coolant passageway direction perpendicular to said first direction and parallel to said first coolant passageway direction.

2. The wind tunnel of claim 1 wherein said first section defines a coolant inflow section, and second section defines a coolant outflow section and said third section joins said first and second sections.

3. The wind tunnel of claim 2 wherein said peripheral edge includes a coolant edge section, said first section includes an inlet at said coolant edge section and said second section includes an outlet at said coolant edge section.

4. The wind tunnel of claim 3 wherein said coolant edge section includes a coolant manifold.

5. The wind tunnel of claim 1 including a plurality of units positioned in side-by-side relationship in a direction perpendicular to said first direction.

6. The wind tunnel of claim 1 including at least one heat exchange module comprised of a plurality of said heat exchanger units positioned in side-by-side relationship in a direction perpendicular to said first direction.

7. The wind tunnel of claim 6 wherein each of said heat exchange modules includes a peripheral edge having a coolant manifold edge section and an opposite edge section.

8. The wind tunnel of claim 7 including a first module set comprising a plurality of said heat exchange modules positioned in side-by-side relationship in a direction perpendicular to said first direction with said manifold edge sections aligned with one another.

9. The wind tunnel of claim 8 including a second module set comprising a plurality of said heat exchange modules positioned in side-by-side relationship in a direction perpendicular to said first direction with said manifold edge sections aligned with one another.

10. The wind tunnel of claim 9 wherein the opposite edge sections of the modules in said first module set are connected with the opposite edge sections of the module in said second module set.

11. The wind tunnel of claim 1 wherein said first heat transfer fins define a plurality of air flow passageways with a generally rectangular cross-sectional configuration.

12. The wind tunnel of claim 1 wherein each of said first, second and third coolant passageways includes a coolant inlet end and a coolant outlet end.

13. The wind tunnel of claim 12 wherein the outlet ends of said first coolant passageways and the inlet ends of said second coolant passageways are connected and the outlet ends of said second coolant passageways and the inlet ends of said third coolant passageways are connected to form a plurality of substantially continuous coolant flow paths through each of said first and second coolant sections.

14. A wind tunnel comprising:

a flow generating member generating a flow path;

a test section in said flow path; and a plate-fin heat exchanger in said flow path comprised of
a plurality of plate-fin heat exchanger units in which each of said heat exchange units includes;
a plurality of heat exchanger plates, said plates being generally planar, being adjacent to and spaced from one another and being aligned generally parallel to said flow path and to one another;
a first pair of said plates defining a first coolant section and a second pair of said plates defining a second coolant section wherein each of said coolant flow sections includes a manifold end having a coolant inlet and a coolant outlet and an opposite closed end;
a plurality of fins extending between each of said first pair of plates and said second pair of plates to define a plurality of first coolant passageways extending in a direction perpendicular to said flow path, a plurality of fins extending between each of said first pair of plates and said second pair of plates to define a plurality of second coolant passageways extending in a direction parallel to said flow path and perpendicular to said first coolant passageways, and a plurality of fins extending between each of said first pair of plates and said second pair of plates to define a plurality of third coolant passageways extending in a direction perpendicular to said flow path and parallel to said first coolant passageways;
at least one of said plurality of plates positioned between said first pair of plates and said second pair of plates;
a plurality of air flow sections, at least one of said air flow sections defined by one of said first pair of said plates and one of said at least one plate and the other defined by at least one of said second pair of plates and said at least one of said plates;
each of said air flow sections including a plurality of fins extending between its respective plates and in a direction generally parallel to said flow path.

15. The wind tunnel of claim 14 including a plurality of said heat exchange units positioned in side-by-side relationship with coolant sections of adjacent said units being directly adjacent to one another.

16. The wind tunnel of claim 14 wherein each of said first, second and third coolant passageways includes a coolant inlet end and wherein the outlet ends of said first coolant passageways and the inlet ends of said second coolant passageways are connected and the outlet ends of said second coolant passageways and the inlet ends of said third coolant passageways are connected to form a plurality of substantially continuous coolant flow paths through each of said first and second coolant sections.

* * * * *